(12) United States Patent
Leung (10) Patent No.: US 6,393,028 B1
(45) Date of Patent: May 21, 2002

(54) METHOD AND APPARATUS FOR PROVIDING EOF FOR FRAME MODIFICATION

(75) Inventor: Eric Tsin-Ho Leung, San Jose, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/257,512

(22) Filed: Feb. 25, 1999

(51) Int. Cl.[7] .......................... H04L 12/54; H04L 12/28
(52) U.S. Cl. ...................... 370/412; 370/429; 370/413
(58) Field of Search .......................... 70/412, 428, 429, 70/413, 415, 447, 400, 389, 402, 401, 431, 432, 419, 395, 315, 445; 709/236, 226, 227, 249

(56) References Cited

U.S. PATENT DOCUMENTS

| 5,515,376 A | | 5/1996 | Murthy et al. ............ 370/85.13 |
| 5,991,304 A | * | 11/1999 | Abramson ................... 370/413 |
| 6,151,322 A | * | 11/2000 | Viswanath et al. .......... 370/395 |
| 6,157,623 A | * | 12/2000 | Kerstein ...................... 370/315 |
| 6,236,643 B1 | * | 5/2001 | Kerstein ...................... 370/400 |
| 6,301,256 B1 | * | 10/2001 | Murthy et al. .............. 370/401 |

* cited by examiner

Primary Examiner—Ajit Patel
Assistant Examiner—Hanh Nguyen (57) ABSTRACT

A multiport data communication system for switching data packets between ports comprising a plurality of receive ports for receiving data packets, a memory storing the received data packets, and a plurality of transmit ports each having a transmit queue. Logic circuitry for each transmit port controls reading of a data packet from memory, provides a control signal indicating an end of reading the data packet from the memory, decides whether a length of the read data packet is to increase, decrease, or remain the same, controls writing the read data packet to a corresponding transmit queue in accordance with the decision, and provides a signal indicating an end of writing the data packet to the transmit queue. To generate the end of reading of the data packet from memory, the logic circuitry determines a number of read operations necessary to read the data packet, corresponding to read address data from the memory, counts each read operation, and provides the signal indicating an end of reading the data packet from the memory when the counted read operations are equal to the number of determined read operations. To generate the end of writing the data packet to the transmit queue, the logic circuitry determines a number of write operations necessary to write the data packet which is modified/unmodified in accordance with decision as to whether a length of the read data packet is to increase, decrease, or remain the same, counts each write operation, and provides the signal indicating an end of writing the data packet to the transmit queue when the counted write operations are equal to the number of determined write operations.

5 Claims, 9 Drawing Sheets

* DA_EOF and AD_EOF are then used in Data Steering State Machine
(Ref. "100M De-Queuing Block Design Document" p.6)

FIG. 6

METHOD AND APPARATUS FOR PROVIDING EOF FOR FRAME MODIFICATION

FIELD OF THE INVENTION

This invention relates to data communication systems, and more particularly, to a method and mechanism for processing frame data read from a memory for transmission from various ports of a communication switch.

BACKGROUND ART

A multiport communication switch may be provided in a data communication network to enable data communication between multiple network stations connected to various ports of the switch. A logical connection may be created between receive ports and transmit ports of the switch to forward received data packets, e.g., frame data, to appropriate destinations. Based on frame headers, a frame forwarding arrangement selectively transfers received frame data (packet data) to a destination station.

Data packets received at a receive port of the communication switch are transferred to an external memory and subsequently retrieved and placed in a transmit queue for transmission from a respective transmit port of the switch. The length of the frame data read from the external memory is sometimes changed prior to writing to the transmit queue. Thus, there is a need to provide a method and mechanism for asserting a control signal indicating when frame data has been read from the external memory and a control signal indicating when the frame data has been written to a respective transmit queue in order to accommodate for a difference between the number of slots required to read from the external memory and the number of slots required to write to the transmit FIFO which may result from changing the length of the frame data read from the external memory.

DISCLOSURE OF THE INVENTION

The invention provides a novel arrangement for denoting when frame data has been read from the external memory and when it has been written to the transmit queue to accommodate a difference between the number of slots required to read frame data from the external memory and the number of slots required to write to the transmit FIFO resulting from modifications to the length of the read frame data. The apparatus includes a multiport data communication system for switching data packets between ports and comprises a plurality of receive ports for receiving data packets, a memory storing the received data packets, a plurality of transmit ports each having a transmit queue, and logic circuitry. The logic circuitry controls reading of a data packet from memory, provides a signal indicating an end of reading the data packet from the memory, decides whether a length of the read data packet is to increase, decrease, or remain the same, controls writing the read data packet to a corresponding transmit queue in accordance with the decision, and provides a signal indicating an end of writing the data packet to the transmit queue.

The logic circuitry also determines a number of read operations necessary to read the data packet, corresponding to read address data, from the memory, counts each read operation, and provides the signal indicating an end of reading the data packet from the memory when the counted read operations is equal to the number of determined read operations. The logic circuitry also modifies the length of the read data packet by increasing the length by a predetermined length when it is decided that the length is to increase and by decreasing the length of the read data packet by the predetermined length when it is decided that the length is to decrease, determines a number of write operations necessary to write the read data packet to the transmit queue in accordance with the decision as to whether the length of the read data packet is to increase, decrease, or remain the same, counts each write operation, and provides the control signal indicating an end of writing the data packet to the transmit queue.

The invention provides also a novel method of processing data packets received by a communication system having a plurality of receive ports for receiving the data packets, a memory storing the received data packets, and a plurality of transmit ports each having a transmit queue, comprising reading the data packet from the memory, asserting a signal indicating an end of reading the data packet from the memory, deciding whether a length of the read data packet is to increase, decrease, or remain the same, writing the read data packet to a corresponding transmit queue in accordance with the decision, and asserting a signal indicating an end of writing the data packet to the transmit queue.

Asserting the signal indicating an end of reading the data packet from the memory includes determining a number of read operations necessary to read the data packet from the memory, counting each read operation, and asserting the signal indicating an end of reading the data packet from the memory when the counted read operations is equal to the number of determined read operations.

Asserting the signal indicating an end of writing the data packet to the transmit queue includes modifying the length of the read data packet by increasing the length by a predetermined length when it is decided that the length is to increase and decreasing the length of the read data packet by the predetermined length when it is decided that the length is to decrease, determining a number of write operations necessary to write the read data packet in accordance with the decision as to whether the length of the read data packet is to increase, decrease, or remain the same, counting each write operation, and asserting the signal indicating an end of writing the data packet to the transmit queue when the counted write operations is equal to the number of determined write operations.

Various objects and features of the present invention will become more readily apparent to hose skilled in the art from the following description of a specific embodiment thereof, especially hen taken in conjunction with the accompanying drawings.

BEST MODE FOR CARRYING OUT THE INVENTION

Figure 1:
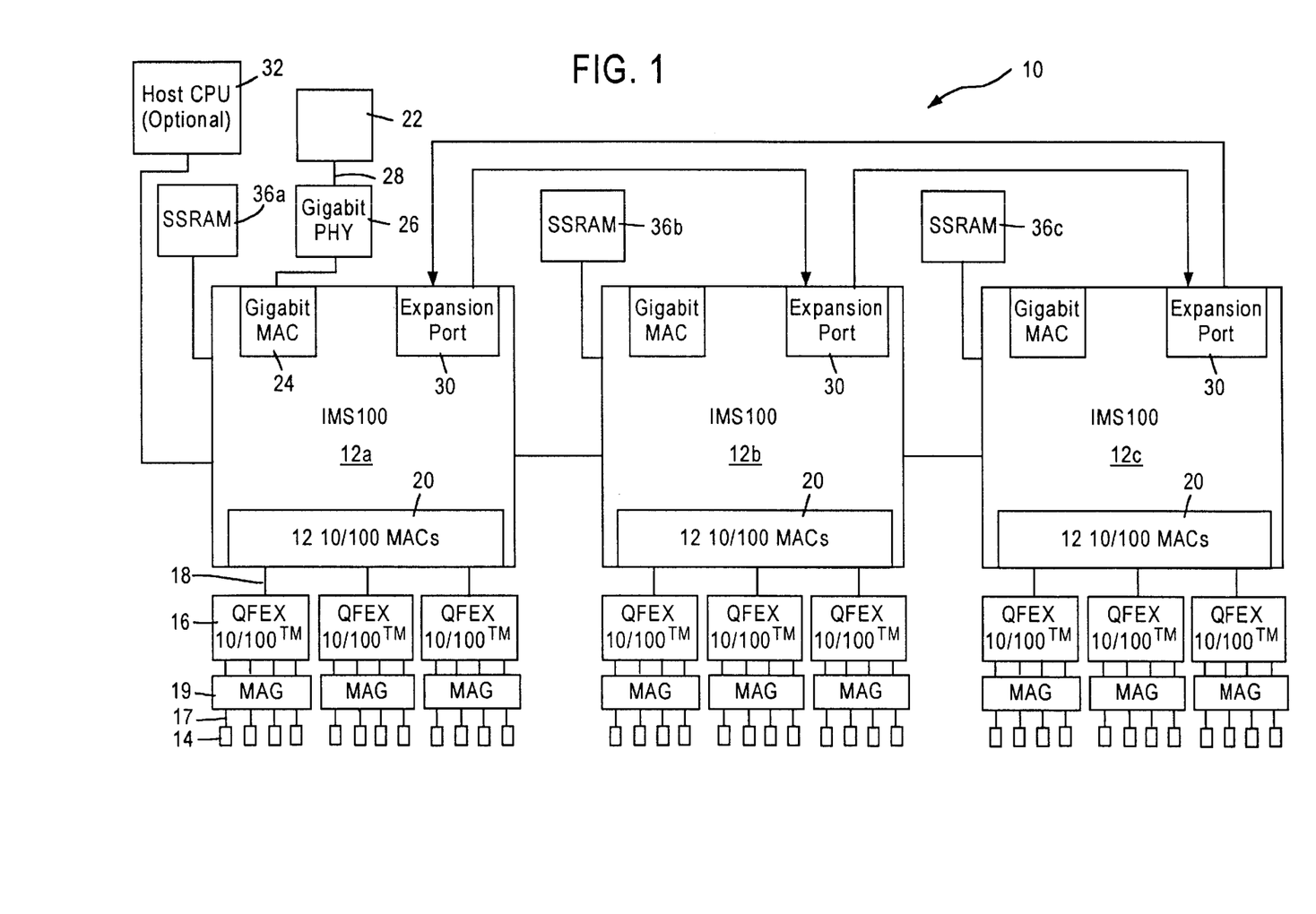
FIG. 1 is a block diagram of a packet switched network including a multiple port switch according to an embodiment of the present invention.

FIG. 1 is a block diagram of an exemplary system in which the present invention may be advantageously employed, The exemplary system 10 is a packet switched network, such as an Ethernet (IEEE 802.3) network. The packet switched network includes integrated multiport switches (IMS) 12 (12a–12c) that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing a deassertion of a receive carrier on the media. Any station 14 having data to send will attempt to access the channel by waiting a predetermined time, known as the interpacket gap interval (IPG), after the deassertion of a receive carrier on the media. If a plurality of stations 14 have data to send on the network, each of the stations will attempt to transmit in response to the sensed deassertion of the receive carrier on the media and after the IPG interval, resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 PHY transceivers 16 configured for sending and receiving data packets to and from the corresponding multiport switch 12 across a corresponding shared media independent interface (MII) 18. In particular, each 10/100 PHY transceiver 16 is configured for sending and receiving data packets between the multiport switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. For example, each expansion port 30 can be implemented as a second gigabit MAC port similar to the port 24, enabling multiple switches 12 to be cascaded together as a separate backbone network.

Figure 2:
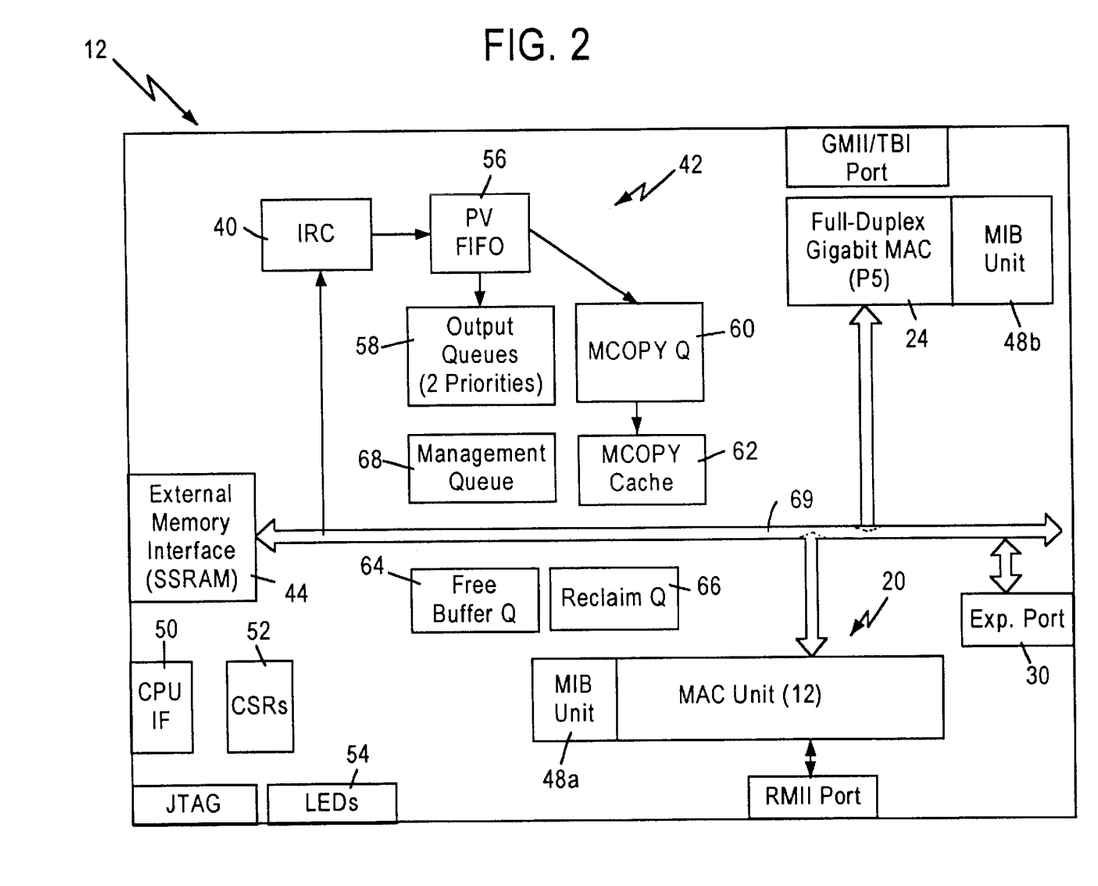
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, a buffer memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and 22. The MIB counters 48 provide statistical network information in the form of management information base (MIB) objects to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the memory 36 for storage of received frame data, memory structures, and MIB counter information. The memory 36 is preferably either a Joint Electron Device Engineering Council (JEDEC) pipelined burst or Zero Bus Turnaround™ (ZBT)-SSRAM having a 64-bit wide data path and a 17-bit wide address path. The External Memory 36 is addressable as upper and lower banks of 128K in 64-bit words. The size off the external memory 36 is preferably at least 1 Mbytes, with data transfers possible on every clock cycle through pipelining. Additionally, the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source and forwarded to at least one destination station.

The multiport switch 12 also includes an LED interface 54 that clocks out the status of conditions per port and drives external LED logic. The external LED logic drives LED display elements that are humanly readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 using the frame pointer.

The IRC 40 monitors (i.e., "snoops") the data bus to determine the frame pointer value and the header information of the received packet (including source, destination, and VLAN address information). The IRC 40 uses header information to determine which MAC ports will output the data frame stored in the external memory 36 at the location specified by the frame pointer. The decision making engine may thus determine that a given data packet should be output by either a single port, multiple ports, or all ports (i.e., broadcast). For example, each data packet includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN (virtual LAN) tag header that identifies the frame information as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should receive the data frame, Rx port number, an untagged set field, VLAN information, opcode, and frame pointer. The port vector identifies the MAC ports to receive the frame data for transmission (e.g., 10/100 MAC ports 1-12, Gigabit MAC port, and/or Expansion port). The port vector FIFO 56 decodes the forwarding descriptor including the port vector, and supplies the frame pointers to the appropriate output queues 58 that correspond to the output MAC ports to receive the data packet transmission. In other words, the port vector FIFO 56 supplies the frame pointer on a per-port basis. The output queues 58 fetch the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68 which can be processed by the host CPU 32 via the CPU interface 50.

The multicopy queue 60 and the multicopy cache 62 keep track of the number of copies of the data frame that are fetched from the respective output queues 58, ensuring that the data packet is not overwritten in the external memory 36 until the appropriate number of copies of the data packet have been output from the external memory 36. Once the number of copies corresponds to the number of ports specified in the port vector FIFO 56, the frame pointer is forwarded to the reclaim queue 66. The reclaim queue stores frame pointers that can be reclaimed by the free buffer queue 64 as free pointers. After being returned to the free buffer queue 64, the frame pointer is available for reuse by the MAC unit 20 or the gigabit MAC unit 24.

Figures 3, 3A:
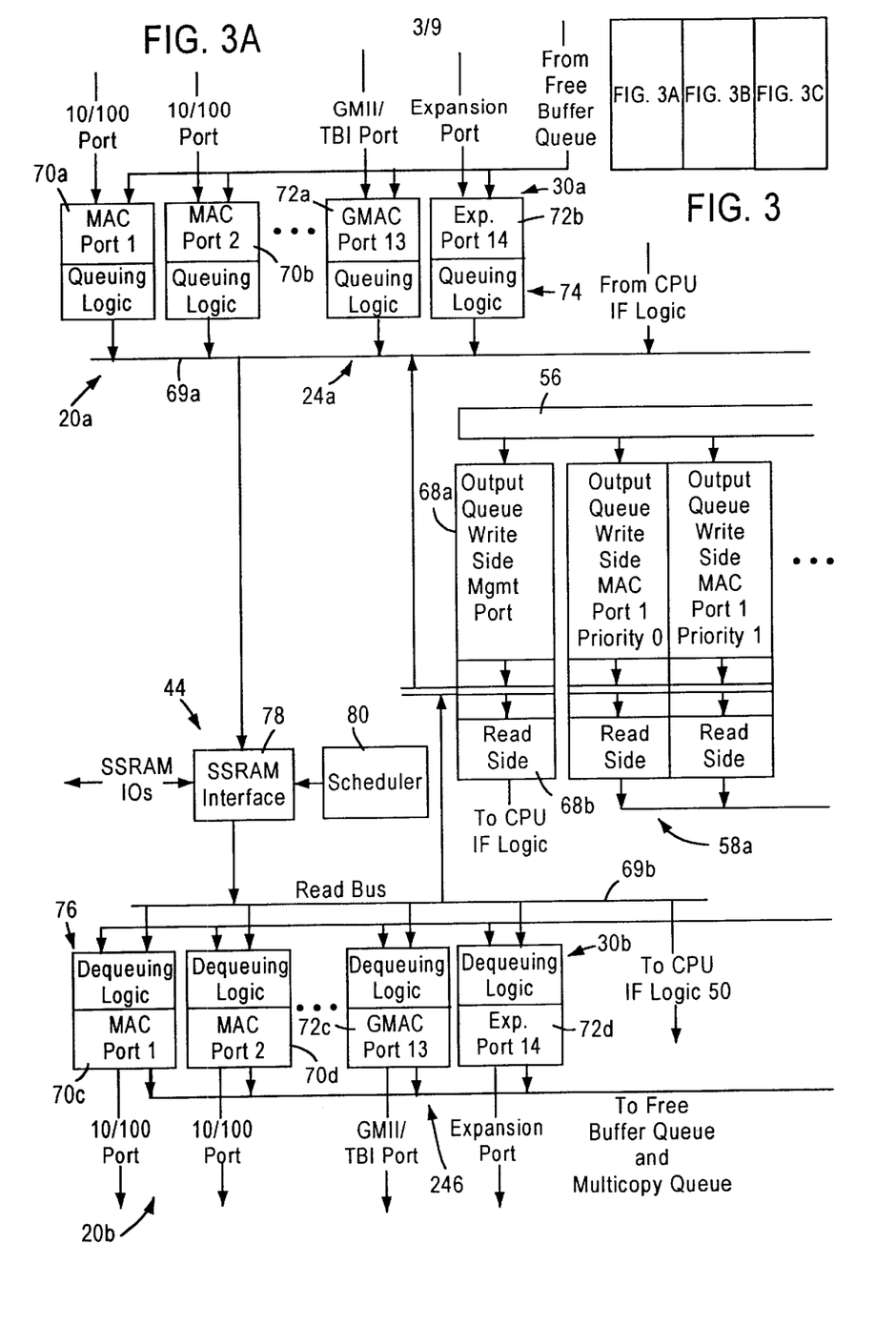
FIG. 3 is a block diagram illustrating in detail the switching subsystem of FIG. 2.
Figure 3B:
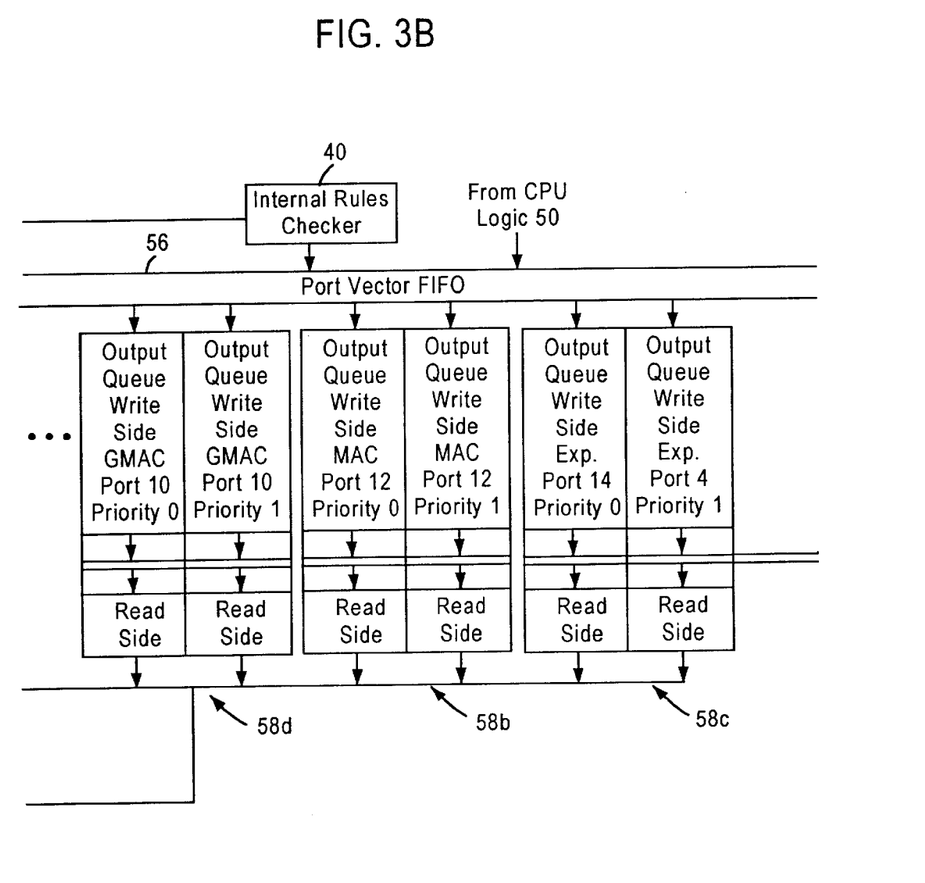
Figure 3C:
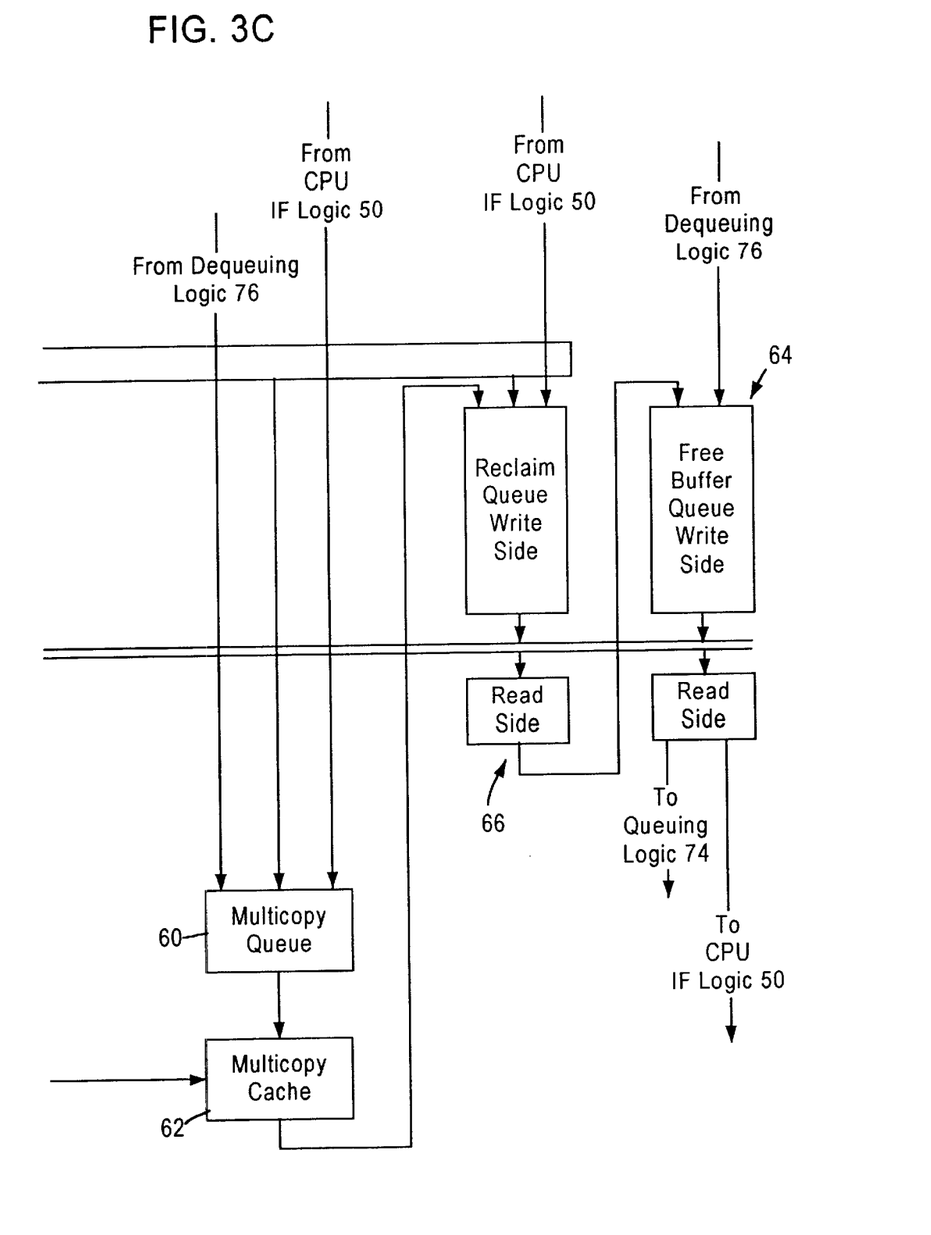

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include 12 MAC modules (only two of each shown and referenced by numerals 70a, 70b, 70c and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72b and 72d, respectively. The MAC modules are configured for full-duplex operation on the corresponding port, and the gigabit MAC modules 72a and 72b are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot based on the retrieved frame pointer. The frame data is stored in the location pointed to by the free buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72b has an associated output queue 58a, 58b, 58c, and 58d, respectively. In preferred embodiments, each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the frame pointer specifies a unicopy transmission, the frame pointer is returned to the free buffer queue 64 following writing the frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

Figure 4:
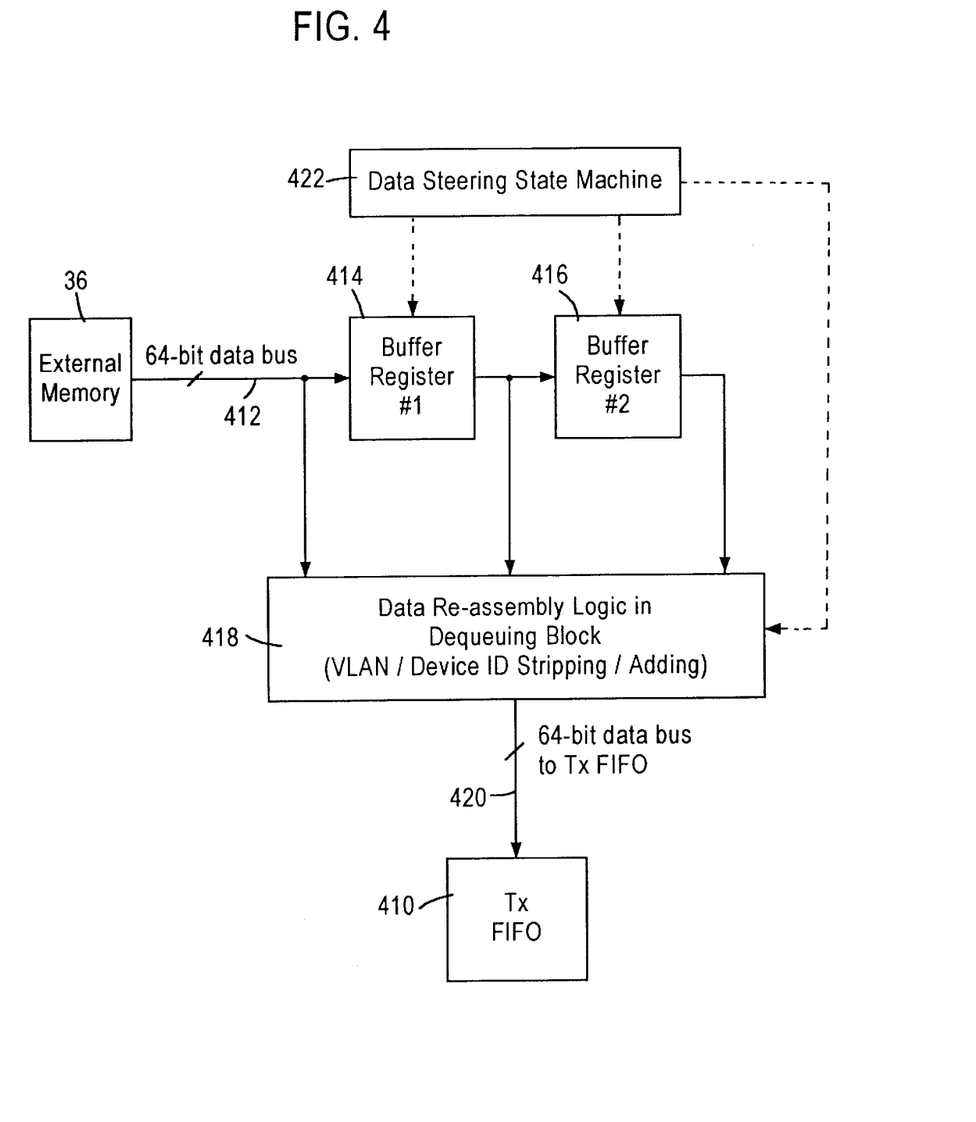
FIG. 4 is a diagram showing a data path from the external memory to the transmit FIFO.

As noted above, the respective dequeuing logic retrieves the frame data from the external memory 36 for a particular output port. FIG. 4 shows a data path from the external memory 36 to the transmit FIFO 410 of a respective output port. At the first read operation, i.e., a first slot (time), 8 bytes of frame data are read from the external memory and transmitted on 64-bit data bus 412 (8×8 =64 bits) to the first buffer register 414. At the second read operation, the frame data in the first buffer register 414 are transferred to the second buffer register 416 (freeing up the first buffer) as well as to the data re-assembly logic 418, and the next 8 bytes of frame data are read from the external memory and transmitted on 64-bit data bus 412 to the first buffer register 414. Therefore, at the end of two slots, both the first and second buffer have been filled. At the third read operation, the data in the second buffer 416 are transferred to the data re-assembly logic 418, frame data in the first buffer register 414 are transferred to the second buffer register 416 as well as to the data re-assembly logic 418, and the next 8 bytes of frame data are read from the external memory 36 and transmitted on 64-bit data bus 412 to the first buffer register 414. During this third read operation, transfer of 8 bytes of reassembled data to the transmit FIFO 410 begins. Operational control of this data path is by data steering state machine 422.

At the beginning of the transfer from the external memory to the transmit FIFO, the MAC dequeuing logic examines the opcode field of the forwarding descriptor to determine whether a VLAN tag should be inserted, stripped, modified, or passed as received. However, when it is determined that a VLAN tag should be inserted or stripped, the length of the frame data will change as a result of the insertion or stripping. This change in the length of the frame data could result in the number of write operations to transfer the "modified" read frame data differing from the number of read operations necessary to read the frame data from the external memory. Therefore, a single end of frame (EOF) control signal is not used for both reading the frame data from the external memory and writing to the transmit FIFO. If the EOF control signal for reading the frame data from the external memory were used for writing to the transmit FIFO and the number of write operations were greater than the number of read operations; e.g., as a result of insertion of a VLAN tag, the EOF control signal would be asserted before all the frame data has been written to the transmit FIFO. Conversely, if the number of write operations were less than the number of read operations, e.g. as a result of stripping of the VLAN tag, efficiency of the system would decrease if the EOF control signal for reading the frame data from the external memory were used for writing to the transmit FIFO since a write operation would occur that is not needed. Consequently, the present invention provides for assertion of an AD_EOF control signal after reading frame data from the external memory 36 and assertion of a DA_EOF control signal after writing frame data to the transmit FIFO. The data path of FIG. 4 is for 10/100 Mb/s network stations. Similar operation occurs for the 1 Gb/s network node with 16 byte data being read via dual time slot logic.

Figure 5A:
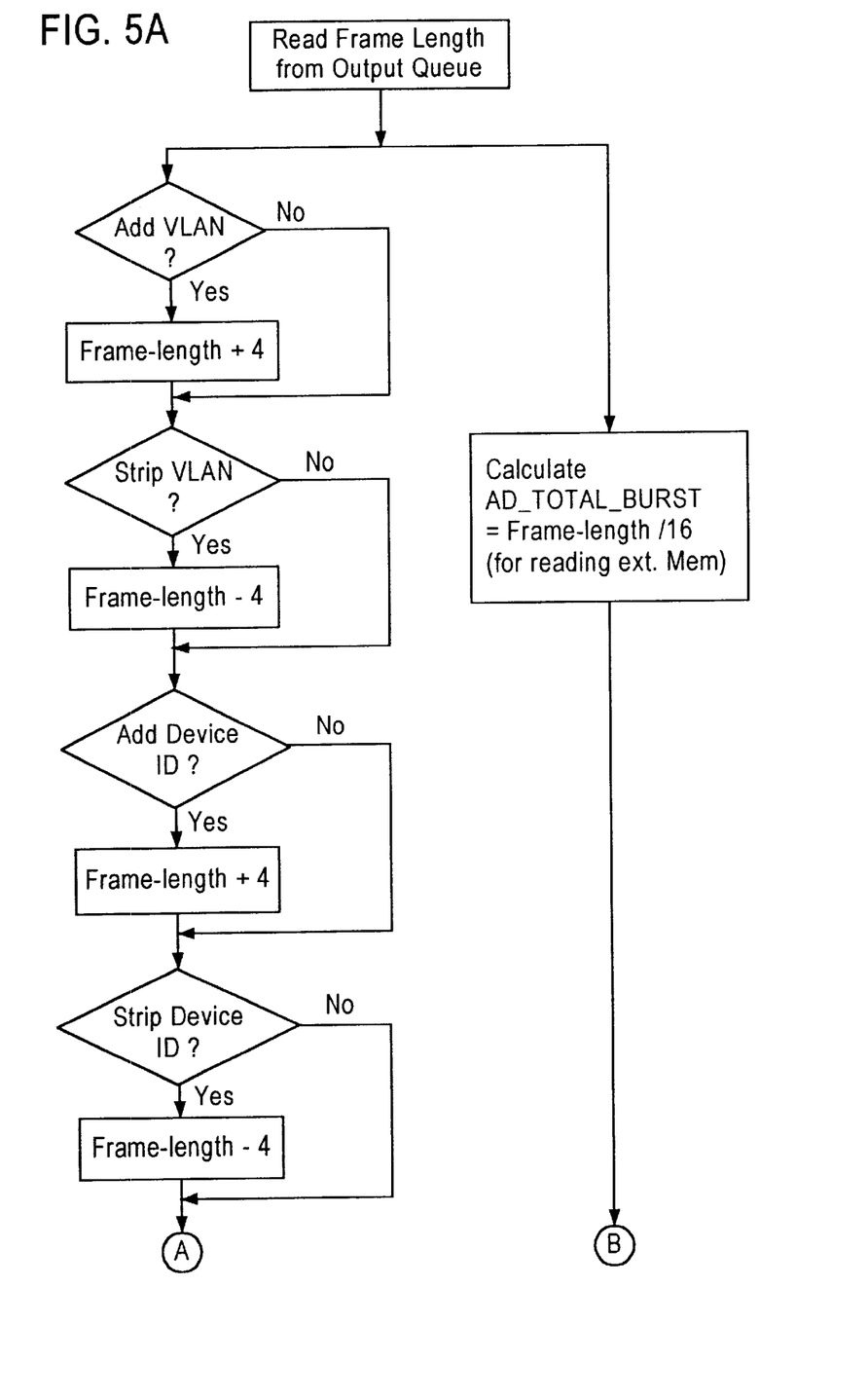
FIGS. 5A and 5B are flow diagrams for generating EOF signals after reading frame data from the external memory and after writing the frame data to the transmit FIFO.
Figure 5B:
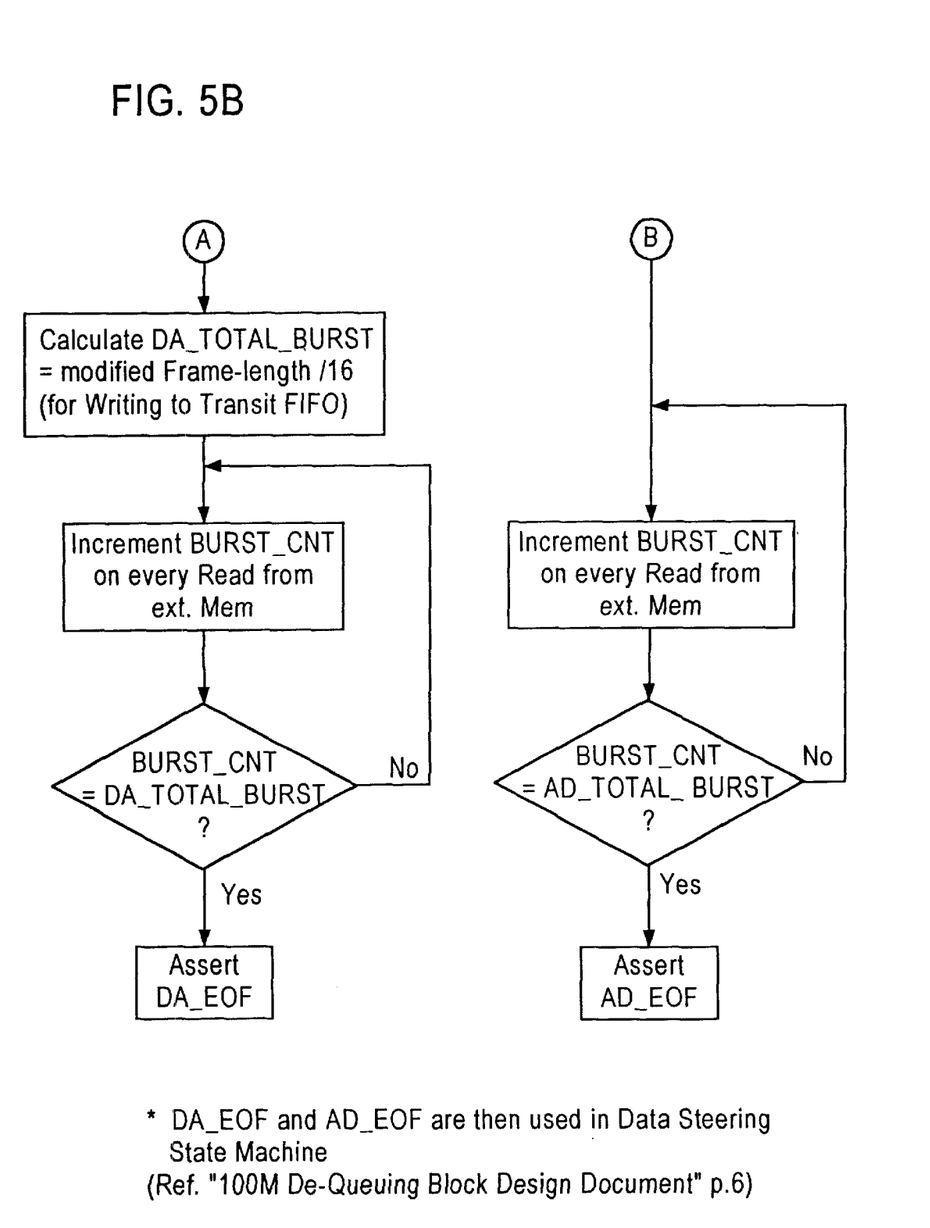

FIGS. 5A and 5B are flow diagrams for generating the AD_EOF and DA_EOF control signals. The frame length (part of the forwarding descriptor) is read from the output queue. As indicated on the right side of the flow path of FIG. 5A, a calculation is made of the number of read bursts (8-bytes are read at a time) which are required to read the frame data from the external memory. Then, as shown in FIG. 5B, a read burst count is incremented at each read burst and compared to the calculated read bursts. When the number of actual read bursts is equal to the calculated read bursts, the reading EOF (AD_EOF) is asserted.

Referring again to FIG. 5A, the forwarding descriptor also indicates whether or not a VLAN tag is to be added or stripped. If a VLAN tag is added, four (4) bytes are added to the frame length and if a VLAN tag is stripped, four (4) bytes are subtracted from the frame length.

As noted above, each multiport switch 12 also includes an expansion port 30 for transferring data between other switches. Thus, each expansion port can be implemented as a second gigabit MAC port, enabling multiple switches to be cascaded together as a separate backbone network. When this is done, a device ID tag is added and four (4) bytes are added to the frame length as in the case for adding a VLAN tag. Similarly, if there is a device ID tag which must be stripped, four (4) bytes are subtracted from the frame length as in the case for stripping a VLAN tag.

Referring again to FIG. 5B, after determining whether or not a VLAN/device ID is added/stripped, a calculation is made of the number of write bursts which are necessary to write the modified/unmodified frame data to the transmit FIFO. The addition/subtraction of the 4 bytes for VLAN/device ID adding and/or stripping can result in the calculated number of bursts to write the modified frame data to the transmit FIFO being different from the number of bursts required to read the frame data from the external memory. After each write burst, a write burst count is incremented and compared to the calculated write bursts. When the number of actual write bursts is equal to the calculated write bursts, the writing EOF (DA_EOF) is asserted. This procedure assures that all data is written to the transmit FIFO in the minimum required number of write bursts.

Figure 6:
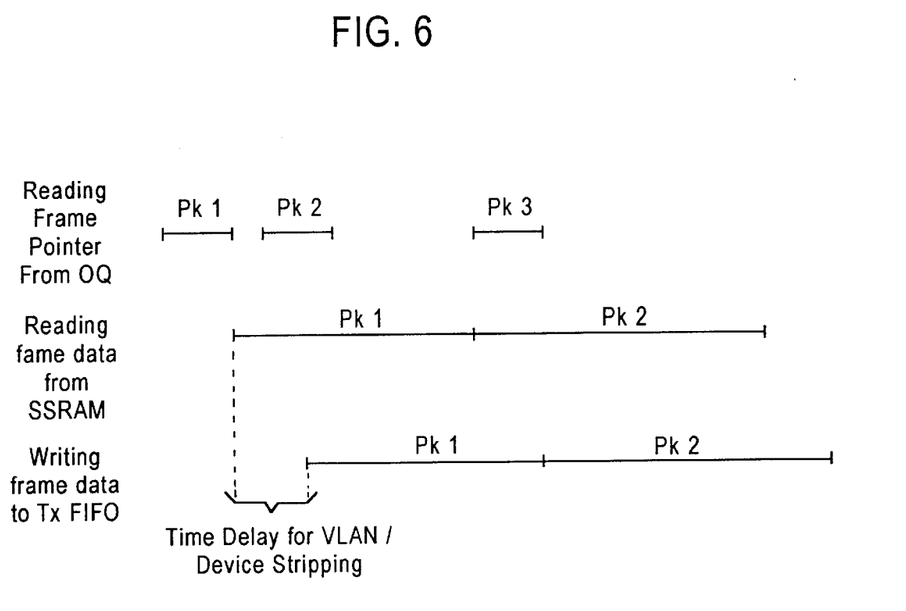
FIG. 6 is a diagram showing pipeline timing for the reading and writing operations according to the present invention.

FIG. 6 is a diagram showing pipeline timing for the reading and writing operations of data packets. As shown, the frame pointer (part of the forwarding descriptor) for the first packet (Pkt 1) is read from the output queue. When this is completed, the frame data begins to be read from the external memory to the first and second buffers. The time for reading frame data from the memory is substantially longer than the time for reading a frame pointer from the output queue.

Since a constant stream of data to the transmit FIFO must be maintained, writing of frame data to the transmit FIFO begins after the first and second buffers are filled. Therefore, there is a time delay before writing frame data to the transmit FIFO begins as shown in FIG. 6. It is during this time delay that a VLAN/device ID can be added/stripped.

After reading frame data from the external memory begins, the frame pointer for the second packet (Pkt 2) is read from the output queue so that the frame data for the second packet can be read from the external memory immediately after finishing reading the frame data for the first packet. Reading of additional frame pointers from the output queue waits until the reading of the frame data for the proceeding packet is completed. Therefore, reading the frame pointer for a fourth packet does not occur until after the frame data for the second packet is completed.

As soon as writing of the frame data for the first packet to the transmit FIFO is completed, writing of the frame data for the second packet to the transmit FIFO begins. The delay between reading of the frame data for the second packet until writing of the frame data to the transmit FIFO for the second packet begins allows a VLAN/device ID for the second packet to be added/stripped if necessary.

Thus, a method and mechanism is provided for asserting a signal indicating when frame data have been read from the external memory and a signal indicating when the frame data have been written to a respective transmit queue in order to accommodate for a difference between the number of slots required to read data from the external memory and the number of slots required to write data to the transmit FIFO which may result from changing the length of the frame data read from the external memory. In this disclosure, there are shown and described only the preferred embodiments of the invention, but it is to be understood that the invention is capable of changes and modifications within the scope of the inventive concept as expressed herein.

What is claimed is:

1. A multiport data communication system for switching data packets between ports, the data communication system comprising:
    a plurality of receive ports for receiving data packets;
    a memory storing the received data packets;
    a plurality of transmit ports for transmitting data packets, each transmit port having a transmit queue; and
    a plurality of logic circuitry corresponding to the plurality of transmit ports, each logic circuitry,
        controlling reading of data packets for the corresponding transmit port from the memory including,
            determining a number of read operations necessary to read from the memory the data packet corresponding to read address data,
            counting each read operation, and
            providing a first signal indicating an end of reading the data packet from the memory when the counted read operations is equal to the number of determined read operations, and
        controlling writing each read data packet to the corresponding transmit queue including, deciding whether a length of said each read data packet is to increase, decrease, or remain the same, increasing the length of said each read data packet by a predetermined length when it is decided that the length is to increase decreasing the length of said each read data packet by the predetermined length when it is decided that the length is to decrease, determining a number of write operations necessary to write said each read data packet to the transmit queue in accordance with the decision as to whether the length of said each read data packet is to increase, decrease, or remain the same, counting each write operation, and providing a second signal indicating an end of writing said each read data packet to the transmit queue when the counted write operations is equal to the number of determined write operations.

2. The system of claim 1, further comprising:

a plurality of first buffers corresponding to the plurality of transmit ports, each connected to the memory and coupled to the corresponding transmit queue;

a plurality of second buffers corresponding to the plurality of transmit ports, each connected to a corresponding first buffer memory and coupled to the corresponding transmit queue; and plurality of data assembly logic corresponding to the plurality of transmit ports, each connected to the memory and the corresponding first and second buffer, and assembling data to be transferred to the corresponding transmit queue in accordance with the decision as to whether a length of said each read data packet is to increase, decrease, or remain the same.

3. The system of claim 2, wherein data for each transmit port are read from the memory to the corresponding data assembly logic and first buffer, and then transferred from the corresponding first buffer to the corresponding data assembly logic and second buffer, data in the second buffer are also transferred to the corresponding data assembly logic, and data in the corresponding data assembly logic are transferred to the corresponding transmit queue.

4. In a communication system having a plurality of receive ports for receiving data packets, a memory storing the received data packets, and a plurality of transmit ports each having a transmit queue, a method of processing a data packet for transfer from the memory to a transmit queue, comprising:

reading the data packet from the memory;

asserting a first signal indicating an end of reading the data packet from the memory;

deciding whether a length of the read data packet is to increase, decrease, or remain the same;

increasing the length of the read data packet by a predetermined length when it is decided that the length is to increase and decreasing the length of the read data packet by the predetermined length when it is decided that the length is to decrease;

determining a number of write operations necessary to write the read data packet in accordance with the decision as to whether the length of the read data packet is to increase, decrease, or remain the same;

counting each write operation writing needed to write the read data packet to a corresponding transmit queue; and asserting a second signal indicating an end of writing the data packet to the corresponding transmit queue when the counted write operations is equal to the number of determined write operations.

5. The method of claim 4, further comprising:

in a first slot, reading data for each transmit port from the memory to a corresponding data assembly logic and a corresponding first buffer, at a second slot, transferring the data from the corresponding first buffer to the corresponding data assembly logic and a corresponding second buffer while reading next data from the memory to the corresponding data assembly logic and the corresponding first buffer, during a third slot, transferring data in the corresponding second buffer to the corresponding data assembly logic while transferring the data from the corresponding first buffer to the corresponding data assembly logic and the corresponding second buffer and reading next data from the memory to the corresponding data assembly logic and the corresponding first buffer, and transferring data in the corresponding data assembly logic to the corresponding transmit queue.

* * * * *